Jan. 13, 1925.

A. VANDERVELD 1,522,763

CLOTH OPERATED RESET FOR MEASURING MACHINES

Filed June 14, 1922  4 Sheets-Sheet 1

Inventor
Anthony Vanderveld
By Frank E. Liverance, Jr.
Attorney

Jan. 13, 1925.

A. VANDERVELD 1,522,763

CLOTH OPERATED RESET FOR MEASURING MACHINES

Filed June 14, 1922    4 Sheets-Sheet 2

Inventor
Anthony Vanderveld
By Frank E. Liverance, Jr.
Attorney.

Jan. 13, 1925.

A. VANDERVELD 1,522,763

CLOTH OPERATED RESET FOR MEASURING MACHINES

Filed June 14, 1922 4 Sheets-Sheet 3

Inventor
Anthony Vanderveld
By Frank E. Liveraus Jr.
Attorney.

Jan. 13, 1925.

A. VANDERVELD 1,522,763

CLOTH OPERATED RESET FOR MEASURING MACHINES

Filed June 14, 1922     4 Sheets-Sheet 4

Inventor
Anthony Vanderveld
By Frank E. Liverance, jr.
Attorney.

Patented Jan. 13, 1925.

1,522,763

UNITED STATES PATENT OFFICE.

ANTHONY VANDERVELD, OF GRAND RAPIDS, MICHIGAN, ASSIGNOR OF ONE-HALF TO CHARLOTTE E. PARRISH, OF GRAND RAPIDS, MICHIGAN.

CLOTH-OPERATED RESET FOR MEASURING MACHINES.

Application filed June 14, 1922. Serial No. 568,147.

*To all whom it may concern:*

Be it known that I, ANTHONY VANDERVELD, a citizen of the United States of America, residing at Grand Rapids, in the county of Kent and State of Michigan, have invented certain new and useful Improvements in Cloth-Operated Resets for Measuring Machines; and I do hereby declare the following to be a full, clear, and exact description of the invention, such as will enable others skilled in the art to which it appertains to make and use the same.

This invention relates to a novel construction of reset mechanism for use in measuring and computing machines of the type shown in my Patent No. 1,420,612. In such machines, at the completion of an operation, it is necessary to separate the measuring and presser rollers to remove the cloth measured, and at the same time apply a brake to the mechanism so that it will not run back to initial position in order that the amount measured and the price thereof may be read. It is also necessary that the mechanism be reset to initial starting zero position before a succeeding operation is attempted in order to obviate the possibility that the succeeding operation shall show a larger amount than it should, or a total of the two operations. To this end I have provided a novel reset mechanism which serves to insure that the brake shall be released and the resetting accomplished on the entrance of cloth into the machine if the reset has not been earlier accomplished. In other words, the cloth on its introduction into the machine automatically actuates the reset control mechanism, releasing the brake and freeing the mechanism for return to zero position. The reset control mechanism also is capable of manual operation, and may be operated prior to the introduction of the cloth into the machine so that the resetting shall have been accomplished before an operation is attempted. My present invention has for its primary object and purpose, the provision of relatively simple and practically operative mechanism for the attainment of the above stated ends, together with provisions for the attainment of many other subsidiary ends, as will appear as understanding of the invention is had from the following description of the invention, taken in connection with the accompanying drawings, showing a preferred embodiment thereof, in which drawings, Fig. 1 is a side elevation of the measuring and computing machine of the invention.

Like reference characters refer to like parts in the several figures of the drawings.

Figure 1:
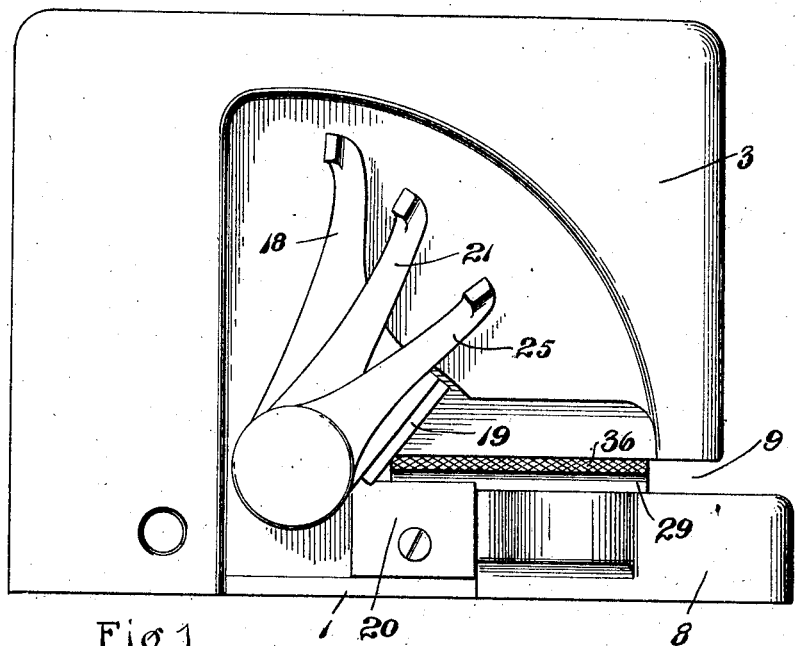

In the construction of the machine, a base 1 of substantially rectangular form is used on which the mechanism is supported. This base and the mechanism above it is covered by a suitable casing or housing having sides 2 and 3, a top 4, back 5 and front 6, the latter terminating a distance above the base. At the front lower portion of the machine, a table 7 positioned horizontally under the lower edges of the front 6 and adjacent sides 2 and 3, is provided, from which downwardly extending front and sides 8 are formed to meet and connect to the base 1. A relatively deep slot 9 is made between the table 7 and the adjacent lower edges of the casing for the entrance of an edge portion of cloth, indicated at C, into the machine for measuring and computing price thereof. It will be noted that the table 7 extends a distance in front of the front 6 of the casing or housing whereby the cloth is readily entered and guided into the slot, this being one feature of novelty in the invention the importance of which will be more apparent when the automatic reset controlled by the cloth entrance is described. The major portion of the top 4 is cut away to provide an opening in which a piece of glass 10 is secured, and in like manner, a glass 11 is provided in connection with the front 6 of the casing.

Figure 7:
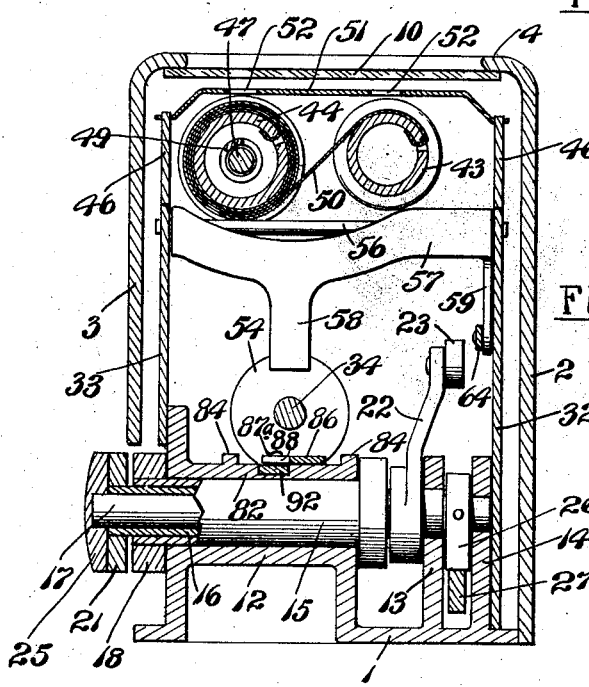
Fig. 7 is a vertical transverse section through the machine at a point between the brake and the control mechanism therefor and looking to the rear at the brake.

The base 1 has an integral upwardly extending post 12 formed therewith at one side and extending transversely partly across the base, spaced from the end of which is an integral upwardly projecting web 13 (Fig. 7) and a short distance therefrom a second web 14. A sleeve 15 extends through and is rotatably mounted in post 12. A second sleeve 16 passes through and is rotatably mounted in sleeve 15 and at its inner end has a mounting in the web 13. A rod or shaft 17 passes through the second sleeve 16 and is rotatably mounted therein, at its inner end having a mounting in the web 14. An operating lever 18 is attached to the outer end of the first sleeve 15, the same carrying a cutting blade 19 designed to cooperate with a second blade 20 secured to the side 3 of the casing at the inner portion of the slot 9 for notching the cloth on depression of the lever.

A second operating lever 21 is secured at the outer end of sleeve 16 for turning the same, and at the inner end of the sleeve an arm 22 is fixed, extending upwardly and having a small roller 23 mounted at its upper end. A spring 24 (Fig. 4) is attached at one end to the arm 22 and at the other end to a suitable stationary part of the machine, the tendency of which is to hold the arm 22 and the lever 21 in upper position.

A third operating lever 25 is secured at the outer end of shaft 17 and adjacent the inner end between the webs 13 and 14 a cam 26 is fixed to act against lever 27 for operation of the frame 28 (Fig. 4) on which the presser roller 29 is mounted, as fully shown in my prior application for patent above noted. This presser roller is mounted under the table 7 and passes upwardly through a slot therein to engage against the measuring roller or the cloth C disposed between them when free to do so. Specifically, it forms no part of the present invention and need not be further outlined.

The mechanism carried by the base 1 is supported by a frame attached to and extending upwardly from the base, including a rear plate 30 paralleling the back 5 of the casing, a front plate 31, paralleling the front 6, and two side plates 32 and 33 paralleling the sides 2 and 3. A shaft 34 (Fig. 4) is disposed horizontally between the plates 30 and 31, having a bearing in the former and at its front end having a bearing in a roller bearing housing 35 fixed to the rear side of the plate 31. A measuring roller 36 provided with a transverse web 36$^a$ is secured on the shaft 34 at the front portion thereof and directly over the presser roller 29. A pinion 37 is secured to the shaft near its rear end and drives a train of gears and pinions 38 for the actuation of shafts 39 and 40 which are for the driving of the indicating mechanism of the measuring machine, not shown in the present case, as not concerned particularly with the invention.

Figure 3:
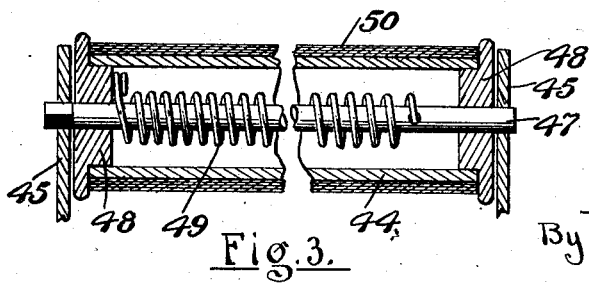
Fig. 3 is a central vertical longitudinal section through the spring actuated roller of the computing chart mechanism.

A gear 41 (Fig. 4) is fixed to shaft 39 and is in mesh with a pinion 42 fixed at one end of a roller 43 which, with a second parallel roller 44 (Fig. 7) is mounted horizontally between the ends 45 of a frame, formed of said ends and two sides 46, and resting on the upper edges of the sides 32 and 33 of the main supporting frame. The roller 44 is hollow and has two ends 48 (Fig. 3) through which a rod 47 passes lengthwise of the roller, one end being squared to fit a like opening in one of the ends 45. A spring 49 is wound around the rod and attached thereto at one end, the other end having connection to one of the ends 48, it being evident that the spring resists rotation of the roller in one direction and tends to turn it in the opposite direction after release from rolling or turning in the first direction. A chart 50 carrying price indication characters is fixed at its ends to the two rollers 43 and 44 and winds from one to the other with the operation of the machine. A plate 51 with longitudinal openings 52 therethrough lies above the chart, one opening over each roller for the disclosure of the price characters through glass 10, as is common in machines of this type.

On the shaft 34 adjacent the pinion 37, a sheet metal U-shaped member 53 (Fig. 5) is mounted, one leg of the member being enlarged to make a bearing member 54 against which the brake may bear. This member is connected with the shaft by a spring shock absorbing device including a spring 55, but for the purposes of this invention it might as well be directly connected to the shaft. It rotates with the shaft and a brake placed against it stops and checks rotation of said shaft 34.

Figure 9:
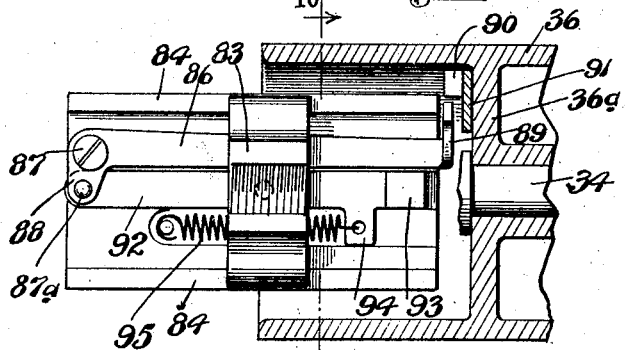
Fig. 9 is a partial horizontal section through the measuring roller and a plan view of the automatic stop mechanism associated therewith.
Figure 10:
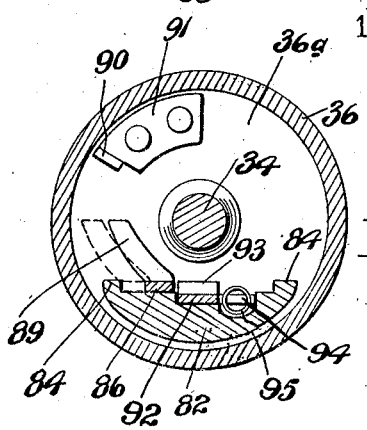
Fig. 10 is a transverse vertical section through the measuring roller on line 10—10, of Fig. 9.

A rod 56 (Figs. 6 and 9) is located between and supported at its ends in plates 32 and 33. A sheet metal brake bar 57 is pivotally mounted on the rod from which an integrally formed brake 58 depends to a point in front of the bearing member 54. At the one end, nearest the plate 32, the bar 57 is formed with an integral depending arm 59 for connection to the brake actuating mechanism as will later appear.

On the inner side of plate 32 in front of the brake bar 57, an irregularly shaped member 60 of sheet metal is pivotally mounted at 61, the same including a downwardly extending arm 62, terminating at its lower end in a rearwardly curved finger 62ª, a rearwardly extending shorter arm 63 connected at its rear end by a link 64 with the lower end of the arm 59 heretofore described, and an upwardly extending arm 65. A spring 66 is attached at one end to the upper end of arm 65 and at its other end to the front plate 31, the tendency of the spring being to turn arm 65 forward and arm 63 upward and draw the brake 58 away from the bearing member 54.

Figure 2:
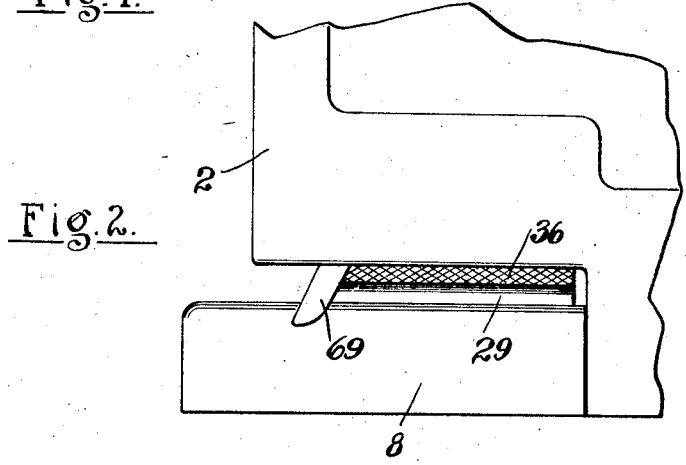
Fig. 2 is a fragmentary side elevation of the machine, at the opposite side to that shown in Fig. 1.

A sheet metal lever 67 is pivotally mounted on the inner side of plate 32 near its upper end and in front of the member 60 at 68, the major portion of the member extending downwardly below the pivot and at its lower end portion being bent laterally and terminating in a finger 69 which passes through an elongated opening 70 in plate 32, the finger passing between plate 32 and the adjacent side 2 of the housing to the slot at 9 and then extending alongside the adjacent side 8 depending from the table 7, as shown in Fig. 2. A pin 71 is connected with and projects laterally from the upper end of member 67, to which one end of a coiled spring 72 is connected, the opposite end connecting to a pin 73 projecting from the member 60 a short distance above pivot 61.

A third sheet metal member 74 is pivotally mounted at 75 to the member 60 near the upper end of the arm 65 thereof. The member 74 extends to the rear a short distance from its pivot and is then turned inwardly to make a stop lug or ear 76 to bear against the rear edge of arm 65, being drawn thereagainst by spring 77 attached to the ear and said pin 73. The member 74 extends a considerable distance farther in front of its pivot 75 and at its front end is formed with a cam edge 78, against which pin 71 bears in one of its positions. Back of the front end a curved slot 79 is cut opening at the upper end and extending downwardly into the front portion of member 74 between two pointed projections 80 and 81, as shown.

Figure 4:
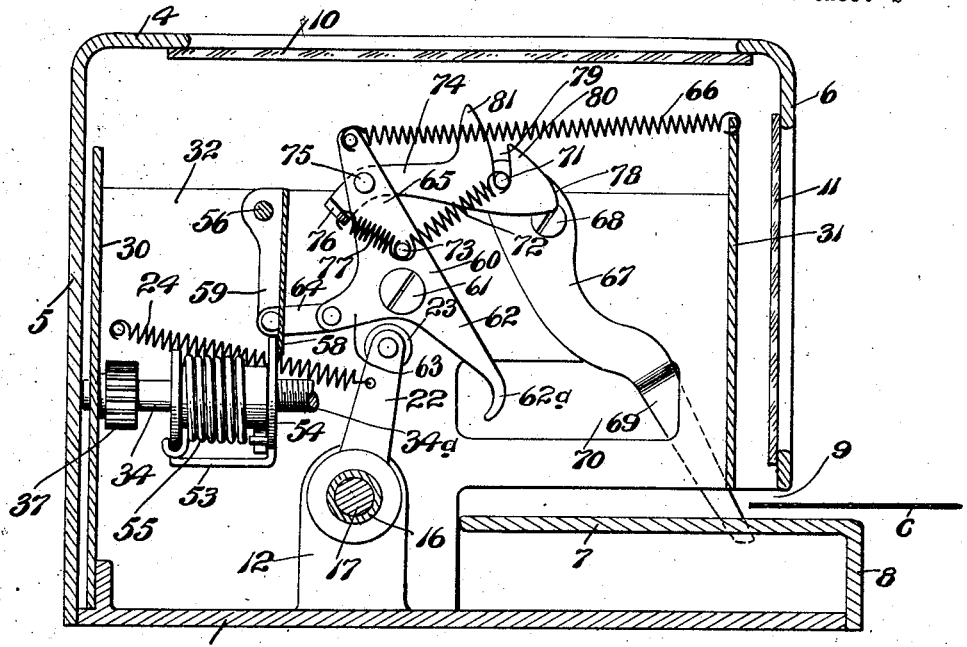
Figs. 4, 5 and 6 are longitudinal vertical sections through the machine, with parts broken away and in section, illustrating the reset and brake control mechanism in three different positions, said mechanism appearing in side elevation.
Figure 5:
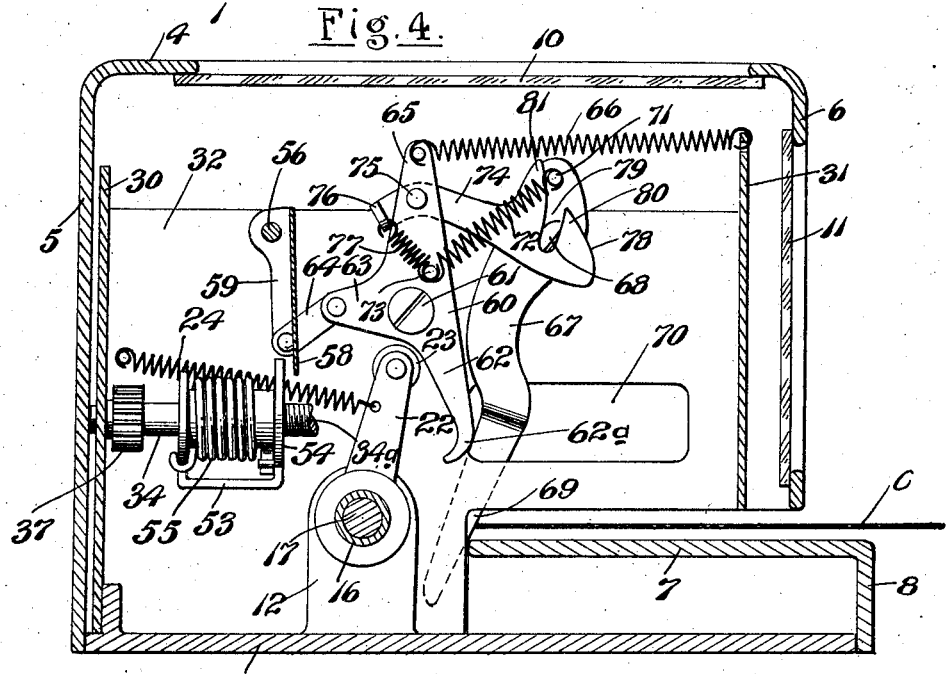
Figure 8:
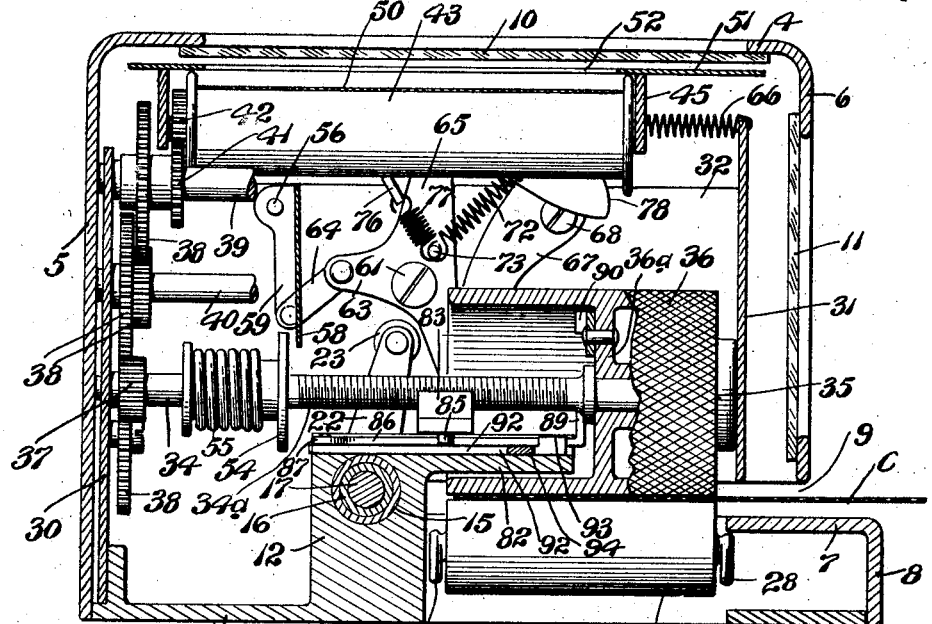
Fig. 8 is a central vertical longitudinal section through the machine, with parts broken away for better disclosure, a stop mechanism to limit the range of operation of the machine being shown.

With this construction as described, the normal position of the parts when the mechanism is at initial zero position is that shown in Figs. 5 and 8. The brake is off the member 54 and the mechanism may be rotated freely. The cloth drawn between the two rollers 29 and 36 drives the shaft 34 and through the gearing shown, the chart 50. At the end of the measuring operation, the levers 18, 21 and 25 may all be depressed, the cloth being notched and the rollers separated. At the same time the brake is set through the following operation: Depression of the lever 21, turns sleeve 16 and moves arm 22 forward to bring roller or wheel 23 against the rear edge of the lower arm 62 of member 60, thereby turning the member about its pivot. This causes a simultaneous downward movement of the arm 63 and a forcing of brake 58 against member 54. As soon as the lever 21 has been depressed, it is released, whereupon the spring 24 carries the arm 22 to its initial position, as shown in Fig. 4. It will be noted that the link 64 and arm 63 make in effect a toggle lever and that the pivotal connection of the same crosses the dead center line between the pivot 61 and the pivot connecting the link 64 to the part 59, whereupon the spring 66 serves to hold the brake against the part 54 when the parts are in the position shown in Fig. 4, but away when in the position shown in Fig. 5. The brake accordingly holds the mechanism from returning to starting position under the influence of spring 49 in roller 44. When the necessary reading has been taken, the brake is to be released. This may be done in two ways. One by manually engaging the lower end of the finger 69 and moving it backward, or the other by inserting the cloth in the slot 9 for the beginning of another operation, whereupon the cloth engages against the finger 69 and moves it backward. In Fig. 4, this is indicated, the cloth being about to engage against said finger 69.

No matter how the finger is engaged and operated, the lever 67 is turned about its pivot 68 with a consequent forward movement of the pin 71 which, located in the slot 79 serves to draw the member 74 forward and turn member 60 about its pivot, raising arm 63 and changing the position of the toggle lever which, as soon as the pivotal center passes the dead center line brings spring 66 into play to further swing member 60 about its pivot in the same direction. Or the parts take the position shown in Fig. 5. Release of the brake places the mechanism under the influence of the spring 49 and the parts are rotated back to starting position. Accordingly, it is impossible to begin a measuring operation at the point where the last one left off, and when the return to zero position is started it is apparent to the operator that no attempted further operation should be begun until zero position has been reached. Of course, the operator may and generally will operate the finger 69 manually but if it is not done, the cloth entrance will automatically take care thereof.

Figure 6:
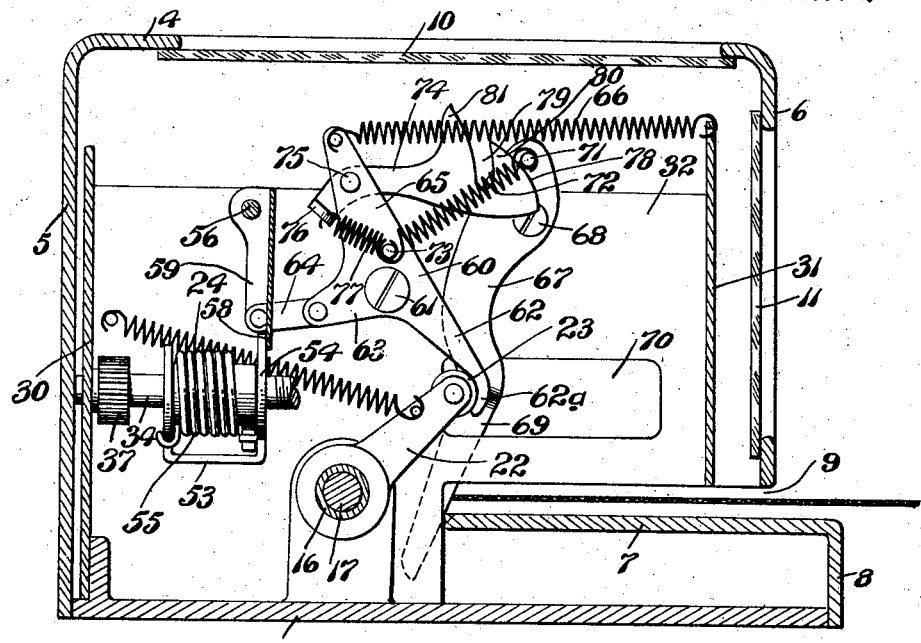

Inasmuch as the cloth is held between the rollers for a time at least before the rollers are separated, and it may be heavy or stiff so as to resist outward movement of the finger 69, means have been provided that the finger lever may stay in its rear position until the cloth is removed. This is indicated in Fig. 6. The brake has been set and all of the parts occupy the same position as in Fig. 4 except the lever 67 which has been held back by the cloth C. The pin 71 has moved over the cam edge 78 and spring 72 stretched and as soon as the cloth is removed this spring will throw the lever 67 to the position shown in Fig. 4, the pin 71 riding over the point 80, depressing the member 74 until the slot 79 is reached.

This mechanism is simple, relatively inexpensive and sure and perfect in its action. The force required to operate the lever 67 is slight and the cloth pressing against such lever is fully sufficient. The outward projection of the table 7 aids in this in that the slot is readily entered without trouble in properly placing the cloth. In fact this forward projection of the table is a marked improvement in any cloth measuring machine of the general type shown, facilitating the cloth entrance to a great degree as is obvious.

I have also provided a stop for the machine operable when a predetermined rotation of the measuring roller away from its initial starting position has taken place. This is desirable in order that the chart 50 shall not be pulled from the rollers from too great an operation of the mechanism. The post 12 adjacent its upper end and at its front side has an integral forwardly extending projection 82 which reaches into the roller 36 (see Fig. 8). A half nut 83 lies on and above this projection and rides on guides 84 (Fig. 9) formed at each side thereof, the shaft 34 having a threaded portion 34$^a$ with which the half nut is engaged, so that it moves back and forth over the post and projection 82 as the shaft is rotated. A pin 85 is connected to and extends downwardly from the half-nut into the space between the guides 84.

A bar 86 is located lengthwise between the guides 84 and pivotally connected at 87 at its rear end to the post 12. A short arm 88 projects laterally from the bar at this end and at its opposite end the bar is turned upward to make a stop portion 89 which is adapted to be moved into the path of a stop lug 90 turned from a plate 91 secured to the web 36$^a$ of roller 36. A second bar 92 parallels the bar 86 and lies in a groove cut lengthwise of the upper side of post 12 and projection 82, the bar 92 being pivotally connected at its rear end to the arm 88, at 87$^a$. At its front end the bar 92 is formed with an upwardly projecting lug 93. The pin 85 in its movements passes over bar 92 and at one end of its movement strikes against the lug 93, thereby moving bar 92 lengthwise and swinging bar 86 outwardly at its front end so as to bring the part 89 into stopping relation with the lug 90. This occurs when the nut has practically traversed the length of the screw threaded portion 34$^a$, and the machine has practically run the limit of its operation.

An ear 94 extends from the bar 92 with which a spring 95 under tension is connected so as to normally draw the bar back to its original position and position the part 89 in inoperative relation to the stop lug 90. The stop is effective only at one point, that at which the unrolling of the chart from roller 44 approaches the end. This stop mechanism is very simple yet effective in all respects for the purposes for which it is designed.

I claim:

1. In a machine of the class described, the combination of mechanism adapted to be driven by contact of moving cloth drawn through the machine, spring means tending to return the mechanism to initial position, a brake adapted to be engaged with a part of the mechanism to hold it against such return, means for setting the brake manually and means for releasing the brake operable by the cloth when it is entered into the machine, substantially as described.

2. In a machine of the class described, the combination of mechanism adapted to be driven by contact of moving cloth drawn through the machine, spring means tensioned by the operation of the mechanism and operable to return the mechanism to initial position when free to do so, a brake movable into engagement with a part of the mechanism to hold it against such return, means for manually setting the brake, and releasing means for the brake comprising a lever adapted to be either manually operated or automatically operated by the entrance of cloth into the machine.

3. In a machine of the class described, mechanism adapted to be driven by contact of moving cloth drawn through the machine, a housing for the mechanism having a horizontal slot at one side for the entrance of cloth to the mechanism, spring means tending to return the mechanism to initial position when moved away therefrom, a brake movable into engagement with a part of the mechanism to hold it against such return, means for manually setting the brake, and means for releasing the brake including a member having a part located adjacent said slot in the housing and movable outwardly when the brake is set, said member being actuated and moved inwardly on entrance of cloth into the said slot to thereby release the brake, substantially as described.

4. In a machine of the class described, a mechanism adapted to be driven by contact of moving cloth drawn through the machine, said mechanism including measuring and presser rollers between which the cloth is located, a casing covering the mechanism and rollers, there being a slot in the casing located horizontally substantially at the meeting line of the rollers, and a table included in the casing at the lower side of the slot, said table extending a distance in front of the front side of the upper portion of the casing above the slot.

5. In a machine of the class described, the combination of mechanism adapted to be driven by contact of moving cloth drawn through the machine, spring means normally tending to return the mechanism to initial position, manually operable means for holding the mechanism in any position to which operated, and means adapted to be operated by insertion of cloth into the machine for releasing said holding means, substantially as and for the purposes described.

6. In a machine of the class described, a mechanism including a shaft, a measuring roller fixed thereon, a presser roller adapted to bear against the measuring roller, cloth being adapted to be drawn between the rollers to actuate the measuring roller, a bearing member connected with the shaft, gearing including in the mechanism, a roller driven by said gearing from the shaft, a chart connected at one end to the roller, a second roller to which the chart is connected at its opposite end, spring means associated with the second roller yieldingly resisting unwinding the chart therefrom to the first roller, a pivotally mounted brake mounted for movement into contact engagement with said bearing member, manually operable means for bringing the brake into engagement with said bearing member, and a member actuated by the setting of the brake into the path of movement of the cloth when it is entered between the rollers, said member acting when returned to original position to release the brake.

7. In a machine of the class described, measuring and presser rollers between which cloth may be drawn for driving the measuring roller, a shaft on which the measuring roller is fixed, a bearing member on the shaft, yielding spring means resisting rotation of the shaft in one direction, a pivotally mounted depending brake located adjacent the bearing member, a link connected to the brake below its pivot, an irregularly shaped member pivotally mounted in front of the brake and including an upwardly extending arm and a rearwardly extending arm to the latter arm said link having pivotal connection, said link and second arm forming a toggle, a spring connected to the upper end of the first arm, a lever pivotally mounted near its upper end in front of the irregularly shaped member and extending downwardly to one side of the rollers, a pin projecting from the upper end of the lever, a spring connected to said pin and said member, a third member pivotally mounted on said first arm adjacent its upper end and having a rear portion turned laterally to form an ear bearing against the rear edge of the said first arm and a longer front portion formed with a slot in its upper side with a curved front cam edge, a spring attached to the rear end of said third member and to the irregularly shaped member, and means for manually turning the irregularly shaped member about its pivot to lower the second arm and move the first arm thereof to the rear, substantially as described.

8. In a machine of the class described, a measuring and a presser roller between which cloth may be drawn to turn the measuring roller, a shaft fixed to the measuring roller, a bearing member on the shaft, spring means tending to rotate the shaft back to initial position after rotation away therefrom, a brake pivotally mounted adjacent the bearing member, manually operable means for forcing the brake into engagement with the bearing member, and a second means connected operatively with the brake operating means located alongside the rollers and moved outward with the setting of the brake, said second means being either manually operable or operable by insertion of cloth between the rollers.

9. In a mechanism of the character described, a measuring roller and a presser roller between which cloth may be drawn to actuate the measuring roller, mechanism driven by the measuring roller including a roller, a spring tensioned by turning of the roller adapted to return the parts to initial position when free to do so, brake means for holding the parts at any position to which operated, manually operable means at one side of the machine for setting the brake means, and movably mounted means at the opposite side of the machine extending downwardly to one side of the measuring and presser rollers adapted for either manual operation or operation by the cloth when inserted between the measuring and presser rollers to release the brake, substantially as described.

10. In combination with a measuring roller adapted to be driven by frictional contact of moving cloth therewith, mechanism driven by the roller, a stop mounted on the roller, a movably mounted stop member mounted adjacent the first stop and normally out of engagement therewith, and means for automatically moving said stop member into the path of movement of the stop on the roller after the roller has made a predetermined number of rotations.

11. In combination with a measuring roller adapted to be driven by frictional contact of cloth therewith, a threaded shaft on which the roller is fixed, a stop connected to the roller, a bar pivotally mounted at one end below the shaft, an arm projecting from the bar, said bar at its free end having a part located adjacent the stop and movable into the path of movement thereof, means connected with the shaft to move lengthwise thereof on rotation of said shaft, and means connected to said arm engaged by said means connected with the shaft for operating part of the bar into the path of movement of the stop on completion of a predetermined number of revolutions of the roller and shaft.

12. In combination with a measuring roller adapted to be driven by frictional contact of moving cloth therewith, a threaded shaft on which the roller is fixed, a stationary support below the shaft, a member mounted to traverse the support and having threaded engagement with the shaft whereby on rotation of the shaft said member is moved, a pin extending from the member toward the support, a bar formed with a projection at one end against which the pin engages to move the bar longitudinally, a second bar pivotally mounted on the support at one end, an arm at said end to which the first bar is connected, said second bar at its opposite end being turned upwardly for a distance, and a stop attached to the roller at a point normally beyond the upturned end of the second bar, said end of the second bar being moved into the path of movement of the stop on engagement of the pin with said projection on the first bar.

13. A construction containing the elements in combination defined in claim 12, combined with a spring connected with the first bar normally tending to move the same in a direction opposite to the movement imparted thereto by said pin.

14. In a machine of the character described, a casing having a horizontal slot located at its lower front portion the full width of the casing, measuring mechanism located within the casing adapted to be driven by cloth drawn through the slot, a horizontal table located at the lower side of the slot and extending to the front a distance farther than the front of the casing above the slot, and depending front and side members to the table, substantially as described.

15. In a machine of the class described, the combination of mechanism adapted to be driven by drawing cloth lengthwise therethrough, spring means normally tending to return the mechanism to initial position, a brake for holding the mechanism in any position to which operated, manually operable means at one side of the machine for setting the brake, and manually or cloth operated means at the other side of the machine for releasing the brake.

16. In a machine of the class described, a mechanism adapted to be driven by contact of moving cloth drawn through the machine, said mechanism including measuring and presser rollers between which the cloth is located, a casing covering the mechanism and rollers, there being a slot in the casing located horizontally substantially at the meeting line of the rollers, a table included in the casing at the lower side of the slot and extending a distance in front of the front side of the upper portion of the casing above the slot, spring means tending to return the mechanism to initial position, a brake adapted to be engaged with a part of the mechanism to hold it against such return, means for manually setting the brake, and means for releasing the brake operable by the cloth when it is entered into the machine at said slot, said forwardly extending portion of the table serving as a support for the cloth to bring it against said brake releasing means.

In testimony whereof I affix my signature.

ANTHONY VANDERVELD.